United States Patent
Wulff

(10) Patent No.: US 9,518,876 B2
(45) Date of Patent: Dec. 13, 2016

(54) METHOD AND MEASURING SYSTEM FOR DETERMINING DEFORMATIONS OF A GEOMETRIC BODY WITH THE AID OF FORCE MEASURING SENSORS OR DEFORMATION MEASURING SENSORS

(71) Applicant: pro-micron GmbH & Co. KG, Kaufbeuren (DE)

(72) Inventor: Kolja Wulff, Kaufbeuren (DE)

(73) Assignee: Pro-micron GmbH & Co. KG, Kaufbeuren (DE)

(*) Notice: Subject to any disclaimer, the term of this patent is extended or adjusted under 35 U.S.C. 154(b) by 221 days.

(21) Appl. No.: 14/341,192

(22) Filed: Jul. 25, 2014

(65) Prior Publication Data

US 2015/0027238 A1    Jan. 29, 2015

(30) Foreign Application Priority Data

Jul. 25, 2013   (DE) .......................... 10 2013 107 953

(51) Int. Cl.
| | |
|---|---|
| G01L 1/04 | (2006.01) |
| G01L 1/00 | (2006.01) |
| G01L 3/10 | (2006.01) |
| G01L 5/00 | (2006.01) |
| G01L 5/16 | (2006.01) |

(52) U.S. Cl.
CPC ............... *G01L 1/005* (2013.01); *G01L 3/108* (2013.01); *G01L 5/0004* (2013.01); *G01L 5/0076* (2013.01); *G01L 5/16* (2013.01)

(58) Field of Classification Search
CPC ........... G01D 18/00; G01B 7/004; B23Q 1/34; G01L 5/226; G01L 5/161; G01L 1/2206; G01L 5/162; G01L 1/2262; G01L 5/16

USPC .............. 73/1.79, 862.621, 862.42, 862.44
See application file for complete search history.

(56) References Cited

U.S. PATENT DOCUMENTS

2006/0107761 A1* 5/2006 Meyer ................. G01L 1/2206
                                                                                       73/862.044
2008/0276726 A1* 11/2008 Rey ....................... G01L 1/2262
                                                                                       73/862.042

FOREIGN PATENT DOCUMENTS

| DE | 4009286 | 9/1991 |
|---|---|---|
| DE | 4009286 A1 | 9/1991 |
| EP | 1889685 | 2/2008 |
| EP | 1889685 A1 | 2/2008 |

(Continued)

*Primary Examiner* — Lisa Caputo
*Assistant Examiner* — Brandi Hopkins
(74) *Attorney, Agent, or Firm* — Sand & Sebolt

(57) ABSTRACT

A method for ascertaining deformations of a geometric body or for measuring forces or torques acting thereon using force measuring sensors or deformation measuring sensors. A plurality of such sensors are arranged on the geometric body in at least two groups. A first group of sensors registers forces acting on the geometric body or deformations of the geometric body in a first spatial direction with reference to a coordinate system fixed relative to the geometric body. A second group of sensors registers forces acting on the geometric body or deformations thereof in a second spatial direction with reference to the coordinate system fixed relative to the geometric body, which is independent of the first spatial direction. Signal outputs of the sensors are compared to one another for the purpose of registering and evaluating signals and for determining or assessing force components or deformation components acting in different spatial directions.

10 Claims, 2 Drawing Sheets

(56) References Cited

FOREIGN PATENT DOCUMENTS

EP 2103379 9/2009
EP 2103379 A1 9/2009

* cited by examiner

METHOD AND MEASURING SYSTEM FOR DETERMINING DEFORMATIONS OF A GEOMETRIC BODY WITH THE AID OF FORCE MEASURING SENSORS OR DEFORMATION MEASURING SENSORS

BACKGROUND OF THE INVENTION

Technical Field

The invention relates to a method for determining deformations of a geometric body and a method for measuring forces or torques acting on a geometric body with the aid of force measuring sensors or deformation measuring sensors. The invention also relates to a corresponding measuring system.

Background Information

In a wide variety of technical applications, information on forces or torques, which act on a body, for example, a tool or a work piece or a tool holding device or the like, or information on deformations of the body caused by corresponding forces or torques, constitute important parameters, which are measured and/or monitored. Thus, applications are known, for example, in which corresponding force sensors or deformation sensors are used to check the correct planar contact and clamping of a tool in a spindle head of a working spindle of a processing machine. Such a method and corresponding monitoring device are described in EP 1 889 685 A1. Here the corresponding monitoring is used in order to identify potential faulty clampings of the machining tool, such as, for example, may be caused as a result of a chip that has penetrated the spindle head or the like. Such a faulty clamping, as described in the publication, results in trajectories of the machining tool that deviate from the set trajectory, and thus to a defective machining of the workpiece, ultimately to losses in quality and finally to rejection.

A further application, in which a corresponding determination of deformations of a geometric body, or the measurement of forces and torques (torsional moments) acting on these bodies plays a role, is described in EP 2 103 379 A1. Here, measured forces or torsional moments are employed for monitoring a machining operation, for example, for detecting whether a tool is being advanced on the workpiece at a desired feed force along the machining path.

One problem in connection with the methods and measuring systems disclosed in the aforementioned publications is that distorted measurement results may frequently occur due to imprecise knowledge about the orientation of the acting forces and torques, or about components thereof, or of the direction of deformation along different coordinate directions. Thus, for example, when monitoring forces or torques, as is described in EP 2 103 379 A1, it is impossible to distinguish in different situations between actual measurement values and system error-related artifacts. Nor, with regard to the measurement technique and measuring system disclosed in EP 1 889 685 A1, is it possible, because of this fact, to invariably and reliably detect all, let alone just minor, deviations and faults with respect to the clamping of the tool emphasized therein.

One option is described in DE 40 09 286 C2, with which a more precise monitoring or measurement of the torsion of a rod-shaped hollow body may be achieved with the aid of resistance strain gauges. For this purpose, variously aligned resistance strain gauge sensors are disposed on a membrane surface attached to the interior of the hollow body, and the former are interconnected with their signal outputs in a bridge circuit. Given the fact that the membrane is deformed in two directions when the pipe is torqued, an amplification of the total signal is achieved as a result of the canny interconnection of the sensors with their signal outputs in the bridge circuit, and with that, an increase in the sensitivity of the measuring unit. Even with this approach, however, the deformation or an applied torsion is monitored along only one spatial direction, in this case along a rotary coordinate direction.

SUMMARY

In light of this known prior art, the object of the present invention is to further refine a method of the aforementioned kind in order to enable a more precise detection of deformations of the geometric body and a more precise measuring of forces or torques acting upon the geometric body. Another aspect of the object to be achieved with the invention is to specify a corresponding measuring system, which, based on the prior art, is further refined for achieving the specified aim.

With regard to the method, this object is achieved by a method for determining deformations of a geometric body and for measuring the forces or torques acting on a geometric body with the aid of force measuring sensors or deformation measuring sensors, wherein multiple force measuring sensors or deformation measuring sensors are arranged in at least two groups on the geometric body, in such a way that a first group of force sensors or deformation sensors registers forces imposed on the geometric body or deformations of the geometric body in a first spatial direction with reference to a coordinate system fixed relative to the geometric body, and a second group of force sensors or deformation sensors registers forces acting on the geometric body or deformations of the geometric body in a second spatial direction with reference to the coordinate system which is fixed relative to the geometric body, which is independent of the first spatial direction, and that signal outputs of the force sensors or deformation sensors are correlated with one another for the purpose of registering and evaluating signals and for determining or assessing force components or deformation components acting in different spatial directions. Advantageous refinements of such a method is characterized in that signal outputs of force sensors or deformation sensors are additively correlated or that the signal outputs of force sensors or deformation sensors are correlated by difference. The method is further characterized in that the signal outputs of the force sensors or deformation sensors are interconnected in an electrical bridge circuit, wherein for each group of force sensors or deformation sensors, at least four force sensors or deformation sensors are provided, and wherein in each case four of the force sensors or deformation sensors are connected with their signal outputs in an electrical bridge circuit, and the output signals of the at least two electrical bridge circuits thus formed are evaluated for determining the deformations and forces or torques. The interconnection of the signal outputs of the force sensors or deformation sensors in the electrical bridge circuits is selected in such a way that output signals of the bridge circuits occur proportionately to the acting forces or to the imposed torque or to a deformation of the geometric body, and that the output signals of the at least two electrical bridge circuits are then evaluated in such a way that they are initially compared with one another and with respect to occurring symmetries proportionately to the acting force or to the imposed torque or to a deformation of the geometric body, and then, when this evaluation demonstrates as plausible results to be expected based on a shape of the geometric body and based on expected forces, torques or deformations and their directions, are classified as a measure for the imposed force, for an applied torque or a deformation that has occurred. The method may additional be characterized in that the geometric body has a preferred axis, and that the first spatial direction is oriented along the preferred axis, the second spatial direction is a radial spatial direction relative to the first spatial direction, or a circular spatial direction pointing along a circumferential direction about the first spatial direction, and that the signals of the electrical bridge circuit are evaluated in polar coordinates or cylindrical coordinates. With regard to the measuring system, this object is achieved by a measuring system for determining a geometric body and for measuring forces or torques acting on a geometric body wherein in each case four of the force sensors or deformation sensors of one group are interconnected with their signal outputs to form an electrical bridge circuit, and the output signals of the at least two electrical bridge circuits are evaluated in order to thereby identify forces and torques or deformations which differ from a symmetrical force or torque applied to the, in particular, symmetrically shaped, geometric body, or from a symmetrical deformation of the, in particular, symmetrically shaped geometric body. Advantageous refinements of such a measuring system include a measuring system for ascertaining deformations of a geometric body or for measuring forces or torques acting on a geometric body with the aid of force measuring sensors or deformation measuring sensors including a plurality of force measuring sensors or deformation measuring sensors arranged on the geometric body in at least two groups in such a way that a first group of force sensors or deformation sensors registers forces acting on the geometric body or deformations of the geometric body in a first spatial direction of a coordinate system fixed relative to the geometric body and a second group of force sensors or deformation sensors registers forces acting on the geometric body or deformations of the geometric body in a second spatial direction of the coordinate system fixed relative to the geometric body, which is linearly independent of the first spatial direction, wherein an evaluation unit is provided, which correlates the signal outputs of the force sensors or deformation sensors for the purpose of registering and evaluating signals and for ascertaining and assessing force or deformation components acting in different spatial directions. The measuring system may further be characterized in that the evaluation unit is configured to additively correlate the signal outputs of force sensors or deformation sensors. The measuring system may be characterized in that the evaluation unit is configured to correlate by difference the signal outputs of force sensors or deformation sensors. The measuring system may further be characterized in that the evaluation unit comprises electrical bridge circuits, wherein for each group of force sensors or deformation sensors, at least four force sensors or deformation sensors are provided, and in each case, four of the force sensors or deformation sensors with their signal outputs are connected in an electrical bridge circuit, and wherein the evaluation unit comprises a signal evaluation unit for evaluating the output signals of the at least two electrical bridge circuits thus formed for ascertaining the deformations and forces or torques. Still further, the measuring system may be characterized in that four each of the force sensors or deformation sensors of one group are interconnected with their signal outputs to form an electrical bridge circuit, and the signal evaluation unit for evaluating the output signals of the at least two electrical bridge circuits is configured in order to identify forces and torques or deformations which differ from a symmetrical application of force or torque on the, in particular, symmetrically shaped, geometric body or from a symmetrical deformation of the, in particular, symmetrically shaped geometric body. The measuring system may still further be characterized in that the signal outputs of the force sensors or deformation sensors are connected in the bridge circuits in such a way that the output signals of the bridge circuits occur proportionately to the acting forces or to the imposed torque or to a deformation of the geometric body, and that the signal evaluation unit is configured to execute the output signals of the at least two electrical bridge circuits in such a way that they are initially compared to one another, proportionately to the acting force or to the imposed torque or to a deformation of the geometric body and evaluated with respect to occurring symmetries, and then, when this evaluation demonstrates as plausible results to be expected based on a shape of the geometric body and based on expected forces, torques or deformations and their directions, are classified as a measure for the imposed force, for an applied torque or a deformation that has occurred. The measuring system may be characterized in that the geometric body has a preferred axis and that the first spatial direction is oriented along the preferred axis, that the second spatial direction is a radial spatial direction relative to the first spatial direction, or a circular spatial direction pointing along a circumferential direction about the first spatial direction, and that the evaluation unit is configured to evaluate the processed signals in polar coordinates or cylindrical coordinates. The force sensors or deformation sensors may comprise strain gauge sensors or SAW sensors. The measuring system may further include means for wireless transmission of sensor signals and/or of data signals obtained by further processing of the sensor signals to a receiver in the evaluation unit.

Similar to the method specified in DE 40 09 286 C2, a plurality of force measuring sensors or deformation measuring sensors is initially also disposed on the geometric body in the method according to the invention for determining deformations of a geometric body, and for measuring forces or torques acting on a geometric body. In this case, the configuration consists of at least two groups, in which a first group of force measuring sensors or deformation measuring sensors detects forces bearing on the geometric body or deformations of the geometric body along a first spatial direction with reference to a coordinate system, which is fixed relative to the geometric body, and a second group of force sensors or deformation sensors detects forces bearing on the geometric body or deformations of the geometric body in a second spatial direction with reference to the coordinate system, which is fixed relative to the geometric body, this second spatial direction being independent of the first spatial direction.

Unlike the prior art disclosure, an evaluation, for example, of signal outputs of the sensors is not carried out in just one manner in order to analyze the impact of forces or deformations along just one single spatial direction (thus, similarly, of those forces or deformations not following this spatial direction, determining only the vectorial component thereof which lies in the spatial direction under consideration), but rather to take into consideration and to assess force components or deformation components in at least two spatial directions, which are independent of one another, based on a correlation of the signal outputs of different sensors.

"Spatial direction" or "spatial directions" are not necessarily understood in this context to mean a linear direction or linear directions. These also include coordinate curves or coordinate directions in non-linear coordinate systems, thus, for example, cylindrical coordinates or polar coordinates. The key is that these involve spatial directions which are independent of one another within the coordinate system.

The signals may be correspondingly evaluated, for example, by adding or subtracting selected sensor signals. In this case, for example, signals from sensors which register components of force vectors or deformation vectors disposed in one spatial direction, are added together in order to obtain a force vector sum or a cumulative deformation. At the same time—in general determined by the geometry of the body—certain sensors (for example, as viewed diametrically opposite one another along a cylindrical plane in a cylindrical configuration) and their signal outputs may be subject to differentiation in order to thereby determine asymmetrically applied forces or deformations in this direction.

In particular, the signal outputs of individual sensors in this case may be correlated in several ways in order to obtain different information. Thus, for example, signals from one group of sensors may be added together in a first evaluation in order to obtain the components of a force or deformation acting in one direction, and at the same time, signals from the same sensors may be linked by way of their difference in a second evaluation, in order, for example, to detect breaks in symmetry.

The signals may be linked both analogically, thus, with analog signals as output signals by way of corresponding interconnections known per se, as well as digitally with initially digitized signals and corresponding software algorithms in a processor unit.

Furthermore, it is also possible in the method according to the invention, as is basically already known in the prior art, to interconnect signal outputs of the force sensors or deformation sensors in a bridge circuit for detecting and evaluating signals. Such a bridge circuit may be implemented in the case of analog signals with appropriate switching elements; in the case of digital or digitalized signals, however, it may also be reproduced virtually in a software-based algorithm.

In particular when using a bridge circuit, it is possible to provide at least four such sensors per group of force sensors or deformation sensors, and it is further possible to connect in each case four of the force sensors or deformation sensors with their signal outputs in an electrical bridge circuit, and it is possible to evaluate the output signals of the at least two electrical bridge circuits thus formed for determining the deformations and forces or torques.

A measuring system according to the invention is accordingly constructed with measuring sensors arranged in the aforementioned groups, the output signals of which are correlated in at least two independent spatial directions in an evaluation unit for correspondingly evaluating force components or deformation components. This may occur, for example, by means of grouping in corresponding bridge circuits. The evaluation unit of the measuring system is then configured to be able to carry out a corresponding evaluation of the output signals of the bridge circuits.

In the bridge circuit used in a preferred embodiment variant according to the invention, in particular, at least eight force sensors or deformation sensors are provided, of which in each case four belong to the first group and an additional four belong to the second group, wherein in such case these force sensors or deformation sensors, each four in number, are combined to form a bridge circuit, and the bridge circuits with their output signals are then included in the evaluation. This makes it possible to obtain a significantly finer detailed image of the forces or torques bearing on the geometric body, and the deformations caused by corresponding forces or torques. Such a correspondingly refined image brings significant improvements to the various applications. Thus, in the case of applications, as described in EP 1 889 685 A1, it is possible to detect more precisely disruptions of a planar and symmetrical clamping of a tool or workpiece in the spindle head, and to issue appropriate warnings or alarm signals. In an application as described in EP 2 103 379 A1, in which forces and torques occurring on the tool or on the tool holder during a machining process are recorded for the purpose of process monitoring and, optionally, process control, it is possible to more precisely assess the recorded values with respect to potential faulty measurements or artifacts, such that a more precise and accurate image is obtained.

Such an increase in precision, however, is not achieved in a manner as described in DE 40 09 286 C2, with just one single bridge circuit and with the kind of evaluation mentioned therein. This requires the provision of a large number of force sensors or deformation sensors and an interconnection—the configuration thereof depending on the application—of the output signals of the corresponding sensors in at least two bridge circuits. It is only in this manner that different forces, torques or deformations occurring along different spatial coordinates may be determined and, depending on the application, integrated in a suitable evaluation for clarifying more precisely the measurement results obtained or for interpreting the signals obtained with respect, in particular, to a comparison of forces, torques or deformations along multiple dimensions (spatial directions).

One possibility for interconnecting the signal outputs of the force sensors or deformation sensors in electrical bridge circuits is to interconnect each of the four force sensors or deformation sensors of a group with their signal outputs to form an electrical bridge circuit, and then to evaluate the output signals of the at least two electrical bridge circuits in a way that suggests forces or torques which deviate from a symmetrical application of force or torque on the, in particular, symmetrically shaped, geometric body, or in order thereby to identify forces and torques or deformations which deviate from a symmetrical deformation of the, in particular symmetrically shaped, geometric body. In this case, the force sensors or deformation sensors of the respective group, in particular, are distributed in a regularly spaced configuration, in particular in a symmetrical configuration, along the geometric body, in order to thereby identify corresponding irregularities and asymmetries in the force effect or torque effect or in the deformation of the body. In this case, an appropriate evaluation is always carried out taking into account at least two (independent) spatial directions, so that, for example, not only axial components, but radial components as well, for example, may be taken into account. The result is a significantly more precise and accurate monitoring option, when such asymmetries with respect to acting forces or torques or with respect to deformations are also identified, which may not manifest in one spatial direction, but in another spatial direction instead. In the context of an application, as disclosed in EP 1 889 685 A1, for example, this means that it is possible to detect more precisely and accurately even the smallest disruptions in the correct and symmetrical retention of a tool or workpiece in the spindle head, and the system is able to issue an alarm.

Another option for interconnection and evaluation provides that the interconnection of the signal outputs of the force sensors or deformation sensors in the electrical bridge circuits is selected in such a way that output signals of the bridge circuits occur proportionately to the acting forces or to the imposed torque or to a deformation of the geometric body. In such case, the output signals of the at least two electrical bridge circuits are then evaluated in such a way that they are compared initially with one another and with respect to occurring symmetries proportionately to the acting force or to the imposed torque or to a deformation of the geometric body, and then, when this evaluation demonstrates as plausible the results to be expected based on a shape of the geometric body and based on expected forces, torques or deformations and their directions, these signals are classified as a measure for the imposed force, for applied torques or a deformation that has occurred. In other words, in the evaluation, an event expected in the given situation is initially presupposed, for example, during material machining with a rotating tool spindle (for example, when drilling, milling or turning) a progression of occurring forces, torques or deformations expected in certain situations; the signal outputs of the bridge circuits are then evaluated in such a way that the measured signals are compared with expected signals, and the signals are then interpreted as a measure of the forces or torques if the results fall within the range of the expected. In the case of a milling operation with a rotating cutting tool, for example, it is possible to roughly predict within an expected pattern the occurrence of a reaction force caused by the cut, based on the speed and the geometry of the blades of the tool. A corresponding evaluation of the bridge circuits and of the signal outputs is initially compared with this expectation and only then further processed, if there is a match with an expected signal curve. If differences arise, a corresponding error message may then be issued during the course of the process, or the corresponding measuring system may generate such an error message. For then, unpredicted irregularities and events could have occurred, for example, the failure of an expected tool cutter or else a system artifact at a different location.

Since the method according to the invention is frequently employed for measuring forces, torques imposed, or for deformations effected, on a geometric body in systems having rotating geometric bodies, in particular geometric bodies rotating about a rotation axis, but in other cases as well, in which corresponding symmetries in the system result, the force sensors and deformation sensors are frequently configured in such a way that a first group is arranged along the axial preferred direction of the body, which may, for example, extend along its rotation axis, a second group is arranged along a circle line drawn around this preferred axis, thus, along a circular spatial direction. A particularly simple and elegant evaluation of the measurement data obtained is then achieved if, in accordance with the coordinate system considered herein, the signal curves are output in polar coordinates or in cylindrical coordinates, in particular, are graphically displayed, for example, recorded once again over a time axis.

For the measuring system according to the invention, and for carrying out the method according to the invention, it is possible to use, in particular, resistance strain gauge sensors or SAW sensors (SAW stands for Surface Acoustic Waves) as force sensors and deformation sensors. In particular, it is suitable to wirelessly configure the transmission of the output signals of the sensors, or data signals received as a result of further processing of the sensor signals, to a receiver integrated in the evaluation unit, for example, via radio technology as is commonly used nowadays in transponder technology.

It is understood that the number of force sensors or deformation sensors is not set at a minimum number of, for example, eight. Here, it is possible instead to employ greater numbers; it is possible, for example, to assemble more than four sensors per group; it is also possible, however, to provide more than two groups, in particular, a third group, along a third independent spatial direction in the coordinate system, which is fixed relative to the geometric body. Accordingly, when using bridge circuits, it is also possible to form more than just two bridge circuits and to base the evaluation on the output signals thereof.

The measuring systems according to the invention are not limited here to just registering deformations or applied forces or torques. Instead, they may be coupled with sensors for registering additional parameters such as, for example, temperature, pressure or the like. In addition, parts of the evaluation unit, in particular, parts of the evaluation electronics in a micro circuit may also be implemented on the geometric body itself. Additional components of the signal evaluation unit may then be formed separately from the geometric body, to which corresponding data may then transmitted from the electronics assembled on the geometric body, in particular, via a wireless transmission.

BRIEF DESCRIPTION OF THE SEVERAL VIEWS OF THE DRAWINGS

Further advantages and features will become apparent from the following description of an exemplary embodiment with reference to the appended figures, in which.

DETAILED DESCRIPTION

Figure 1:
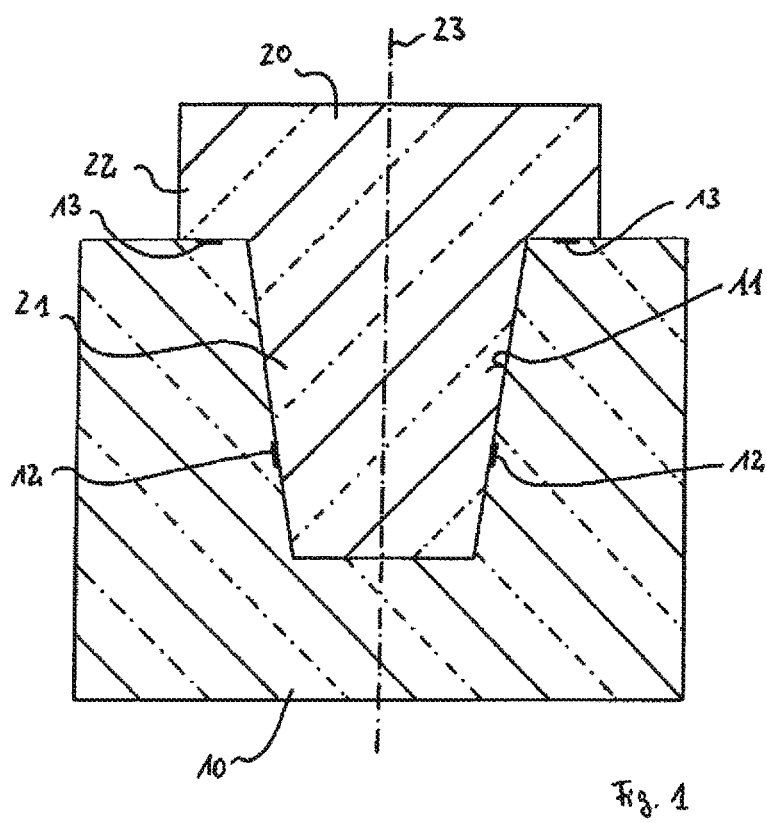
FIG. 1 shows a schematic sectional view through a configuration of two bodies, one form-fitted inside the other, having force sensors situated at different positions on the boundary surfaces.

FIG. 1 schematically shows a sectional view through a configuration of two bodies 10, 20, one form-fitted inside the other. The body 10 includes a conical holder 11 integrated in the body, in which a corresponding, conical connection piece 21 of the body 20 is inserted. The body 20 also includes a collar 22, which extends laterally beyond the connection piece 21. As is apparent, in particular, in FIG. 2, the body 20 is rotationally symmetrical in design about its longitudinal axis 23 with a circumferential, projecting collar 22.

First, force sensors 12 are arranged in the interior of the holder 11 at the same level perpendicular to the longitudinal axis 23 of the body 20, in such a way that they are able to register forces transmitted from the connection piece 21 to the surface of the holder 11, which act perpendicular to the boundary surfaces. As is apparent in FIG. 2, a total of four such first force sensors 12 are arranged in this exemplary embodiment, in each case at an angular offset of 90° about the longitudinal axis 23.

Second force sensors 13 are arranged in the body 10 in an area of the surface that is covered by the circumferential collar 22 of the second body 20, when the second body 20 with its connection piece 21 is seated in the holder 11 of the first body. These second sensors 13 are constructed and configured in such a way that they are able to register and record forces acting perpendicular to the surface of the first body 10, in the area in which they are arranged, thus, parallel to the longitudinal axis 23.

Figure 2:
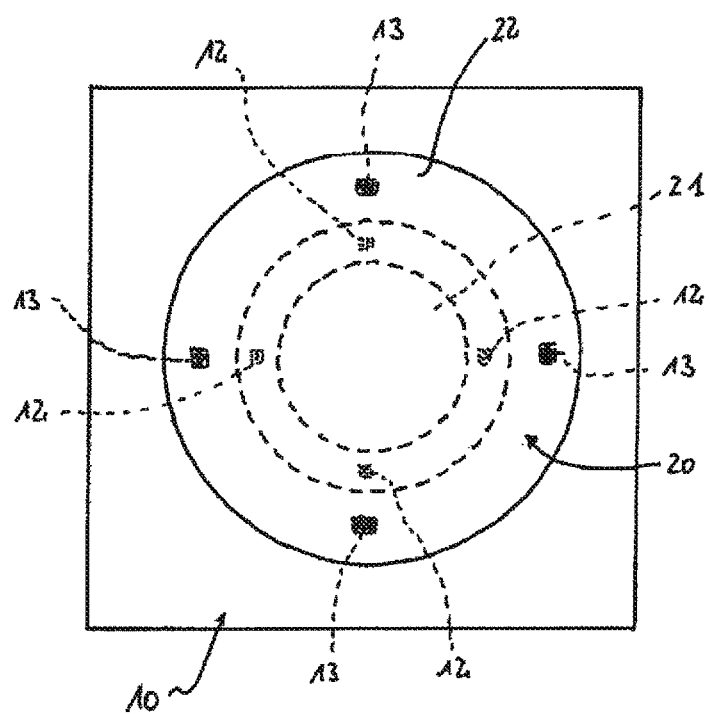
FIG. 2 shows a top view of the configuration according to FIG. 1.

Here, too, FIG. 2 in turn shows that a total of four such second sensors 13 are arranged in the exemplary embodiment, again each distributed at 90° about the longitudinal axis 23, in this exemplary embodiment aligned the same in terms of their radial distribution as the first force sensors 12.

When forces act on one of the bodies 10 or 20, corresponding measurement values of the force sensors 12 or 13 are triggered. If, for example, a force oriented in the direction of the longitudinal axis 23 acts on the body 20, then each of the force sensors 13 measures an equally high value, if the effect of the force is oriented exactly parallel to the longitudinal axis 23. In such a situation, the force sensors 12 will also measure a value for a force, namely, the vector component of the force acting in the direction of the longitudinal axis 23 acting perpendicular to the surface of the holder 11 in this area.

At this point within the scope of the present invention, the signal outputs of the force sensors 12 and 13 are correlated with one another for evaluating such an acting force. This may be accomplished in very different ways. The second force sensors 13 may, for example, be additively interconnected, in order in this way to obtain a signal for the total magnitude of force exerted in the direction of the longitudinal axis 23.

Similarly, it is also possible, however, to subtractively interconnect pairs of oppositely disposed sensors of the second force sensors, for example, an interconnection as in a Wheatstone bridge, in order then to obtain a response, only if a force is to be measured deviating from forces in a direction of orientation parallel to the longitudinal axis 23. In such an exemplary embodiment, the first force sensors 12 are each then also subtractively interconnected in opposite pairs, in order, via these pairs as well, to register vectorial components in a second measuring direction independent of the first measuring direction of the first force sensors 13 oriented parallel to the longitudinal axis 23. If transverse forces occur, thus, forces oriented transverse to the longitudinal axis 23 of the first body, these may then be registered, in particular, even in the case of very small values of the first force sensors 12, since the latter are particularly sensitive to force components in a corresponding transverse direction. The second force sensors 13, which measure only the force components of the occurring forces oriented in the direction of the longitudinal axis 23, are comparatively insensitive to minimal deviations of the forces from such an orientation parallel to the longitudinal axis 23.

Knowledge of a corresponding direction of orientation of an acting force which deviates from the longitudinal direction 23 may be of great interest, for example, if the first body 10 with the holder 11 is a tool holder (a tool spindle) of a processing machine, and the second body 20 is a coupling segment of a tool. If, namely, when changing a tool, a foreign body, for example, a chip, enters the holder 11 and falls to the bottom or to another point, this results in a disruption of the planar contact of the second body 20, thus, to a tilting or, in a clamping process oriented in the direction of the longitudinal axis 23, to a corresponding asymmetrical application of force, i.e., a transverse force, to which the first force sensors 12 sensitively react, and which are detected in a subtractive interconnection as described above. The same functionality may also be utilized for the reliable detection of geometric defects in the contact surfaces of the body 20.

In other examples, however, it may be of particular advantage not to interconnect the force sensors 12 subtractively, for example, but in another manner, in order, for example, to obtain information about the precise magnitude of transverse forces occurring, for example, when machining with a tool, in order to determine the engagement forces with which, for example, a milling blade engages a tool. When, for example, a three-bladed tool is used, the engagement forces of the three blades may be registered and compared to each other. If asymmetries in the engagement forces result, then a conclusion may be drawn about the wear of the tool or about some other defect.

In the same way, force sensors of the first force sensors 12 and of the second force sensors 13, respectively, may also be correlated in order, in this case, to register and track additional, dynamically acting forces.

For this purpose, the force sensors 12, 13 are connected by a corresponding signal line to a control or evaluation unit in a manner not further depicted in the figures, or to a transmitter unit for wirelessly transmitting signals to a receiver situated outside the two bodies 10, 20 for further signal processing.

The force sensors 12, 13, which may also be deformation sensors, may, for example, be resistance strain gauges (strain gauge sensors). Sensors of a different design, for example, SAW sensors, may also be considered, however. The last-mentioned sensors have the advantage that they may also be used for registering additional measured variables, for example, for measuring temperature and the like.

If the output signals are obtained in an analog manner, (for example, in the case of strain gauge sensors), corresponding relations between the signal outputs may be obtained by analog interconnection (for example, by the previously mentioned Wheatstone bridges). If digital signal outputs are present (for example, in the case of SAW sensors), the signals are then correlated in a corresponding digital evaluation unit. This offers, in particular, the advantage that multiple evaluations may be performed in a simple manner and without loss of signal strength (which must be tolerated in the case of analog signals as a result of corresponding splitters of the signal lines for multiple, parallel evaluations), i.e., pairs of sensors may be correlated with one another additively or subtractively or in some other manner.

The particular advantage of the solution according to the invention is that sensors are used here, which are able to measure force or deformation having vectorial components in linearly independent directions, such that highly precise measurements can be made, and at the same time a wide variety of information may be gained in a variety of ways as a result of the correlation. In turn, suitable coordinate systems may then be selected to evaluate the information obtained. In the example of the system depicted in the figures, for example, a cylindrical coordinate system may be used, which has a coordinate axis along the longitudinal axis 23 and corresponding angular coordinates.

10 body
11 holder
12 first force sensors
13 second force sensors
20 body
21 connection piece
22 collar
23 longitudinal axis

The invention claimed is:

1. A method for ascertaining deformations of a geometric body or for measuring forces or torques acting on the geometric body with the aid of force measuring sensors or deformation measuring sensors, comprising:
arranging multiple force measuring sensors or deformation measuring sensors in at least two groups on the geometric body;
registering forces imposed on the geometric body or deformations of the geometric body in a first spatial direction with a first group of force sensors or deformations sensors with reference to a coordinate system fixed relative to the geometric body;

registering forces acting on the geometric body or deformations of the geometric body in a second spatial direction with a second group of force sensors or deformation sensors with reference to the coordinate system which is fixed relative to the geometric body, wherein the second spatial direction is independent of the first spatial direction;

outputting signals from the force measuring sensors or deformation measuring sensors of each of the first group and the second group;

correlating the signal outputs from the first group of force sensors or deformation sensors with signal outputs from the second group of force sensors or deformation sensors, and wherein correlating the signal outputs includes:

interconnecting the signal outputs from the force sensors or deformation sensors in the first group and in the second group in an electrical bridge circuit, wherein the interconnection of the signal outputs is selected such that the signal outputs of the electrical bridge circuit occurs proportionately to the acting forces or to the imposed torque or to the deformation of the geometric body, and wherein the step of interconnecting the signal outputs further comprises:

providing at least four force sensors or deformation sensors in the first group and providing at least four force sensors or deformation sensors in the second group;

connecting the signal outputs of four of the at least four force sensors or deformation sensors in the first group in a first electrical bridge circuit;

connecting the signal outputs of four of the at least four force sensors or deformation sensors in the second group in a second electrical bridge circuit:

registering and evaluating the correlated signal outputs of at least the first and second electrical bridge circuits, wherein the evaluation includes:

comparing the signal outputs of at least the first electrical bridge circuit and the second electrical bridge circuit with respect to occurring symmetries and proportionately to the acting force or to the imposed torque or to the deformation of the geometric body;

determining or assessing from the evaluated signal outputs force components, torques or deformation components acting on the geometric body in different spatial directions: and classifying as a measure for the imposed force, or the applied torque or the deformation that has occurred when the evaluation demonstrates as plausible results to be expected based on a shape of the geometric body and based on expected forces, torques or deformations and their spatial directions.

2. The method according to claim 1, wherein the signal outputs of force sensors or deformation sensors are additively correlated.

3. The method according to claim 1 wherein the signal outputs of force sensors or deformation sensors are correlated by difference.

4. The method according to claim 1, wherein the geometric body has a preferred axis, and that the first spatial direction is oriented along the preferred axis, the second spatial direction is a radial spatial direction relative to the first spatial direction, or a circular spatial direction pointing along a circumferential direction about the first spatial direction, and that the signals of the electrical bridge circuit are evaluated in polar coordinates or cylindrical coordinates.

5. A measuring system for ascertaining deformations of a geometric body or for measuring forces or torques acting on the geometric body, comprising:

a plurality of force measuring sensors or deformation measuring sensors arranged on the geometric body in at least two groups wherein:

a first group of at least four force sensors or deformation sensors registers forces acting on the geometric body or deformations of the geometric body in a first spatial direction of a coordinate system fixed relative to the geometric body wherein the first group of force sensors or deformation sensors output signals; and a second group of at least four force sensors or deformation sensors registers forces acting on the geometric body or deformations of the geometric body in a second spatial direction of the coordinate system fixed relative to the geometric body, and wherein the second spatial direction is linearly independent of the first spatial direction and wherein the second group of force sensors or deformation sensors output signals;

an evaluation unit operatively engaged with the first group and second group, wherein the evaluation unit correlates the signal outputs of the force sensors or deformation sensors of the first group and the second group and registers and evaluates the signal outputs, and wherein said evaluation unit ascertains and assesses force or deformation components acting in different spatial directions, and wherein the evaluation unit comprises:

at least two electrical bridge circuits, wherein each of the at least two electrical bridge circuits connects together four of the force sensors or deformation sensors in each of the first group and the second group, wherein the signal outputs of the at least two electrical bridge circuits occur proportionately to forces acting on the geometric body or to torque imposed on the geometric body or to a deformation of the geometric body; and a signal evaluation unit that evaluates the signal outputs of the at least two electrical bridge circuits and ascertains the deformations and forces or torques acting on the geometric body, wherein the signal evaluation unit is configured to execute the signal outputs of the at least two electrical bridge circuits such that they are initially compared to one another, proportionately to the acting force or to the imposed torque or to a deformation of the geometric body and the signal outputs are further evaluated with respect to occurring symmetries, and when this evaluation demonstrates, as plausible, results to be expected based on a shape of the geometric body and based on expected forces, torques or deformations and their spatial directions, the signal outputs are classified as a measure for the imposed force, for an applied torque or a deformation that has occurred.

6. The measuring system according to claim 5, wherein the evaluation unit is configured to additively correlate the signal outputs of the force sensors or deformation sensors.

7. The measuring system according to claim 5, wherein the evaluation unit is configured to correlate by difference the signal outputs of the force sensors or deformation sensors.

8. The measuring system according to claim 5, wherein the geometric body has a preferred axis and that the first spatial direction is oriented along the preferred axis, wherein the second spatial direction is a radial spatial direction relative to the first spatial direction, or a circular spatial direction pointing along a circumferential direction about the first spatial direction, and wherein the evaluation unit is configured to evaluate the processed signals in polar coordinates or cylindrical coordinates.

9. The measuring system according to claim 5, wherein the force sensors or deformation sensors comprise strain gauge sensors or Surface Acoustic Waves (SAW) sensors.

10. The measuring system according to claim 5, further comprising a wireless transmitter and a receiver, wherein the receiver is in the evaluation unit, and wherein the transmitter wirelessly transmits sensor signals or data signals obtained by further processing of the sensor signals to the receiver in the evaluation unit.

\* \* \* \* \*